April 9, 1957     J. A. DE FRANCESCO     2,788,239

AUXILIARY COMPARTMENT SPARE WHEEL SUPPORT

Filed April 26, 1955

INVENTOR.
JOSEPH A. DE FRANCESCO
BY
McMorrow, Berman & Davidson
ATTORNEYS

United States Patent Office 2,788,239
Patented Apr. 9, 1957

2,788,239

AUXILIARY COMPARTMENT SPARE WHEEL SUPPORT

Joseph A. De Francesco, Detroit, Mich.

Application April 26, 1955, Serial No. 503,984

3 Claims. (Cl. 296—37.2)

The present invention relates to automobiles, and in particular to a support for a spare wheel.

The primary object of the present invention is to provide a support for a spare wheel to occupy the space under the body paneling rearwardly of the rear wheels of an automobile.

Another object of the present invention is to provide a spare wheel support which normally occupies no space in the rear luggage compartment of an automobile and one which moves into the compartment in such a position that a spare wheel may be easily mounted thereon or removed therefrom.

A further object of the present invention is to provide a spare wheel support having a solid surface and one which when mounted in one side of the luggage compartment of an automobile is swingable to a sloping position in the compartment at which any mud or snow deposited on the surface while replacing wheels is easily swept toward the rear edge of the surface and outwardly of the compartment without soiling the compartment floor or articles thereon.

Figure 1:
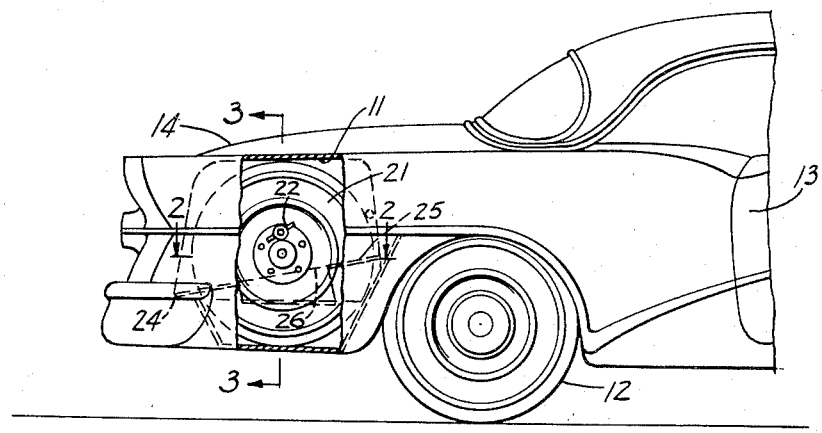
Figure 2:
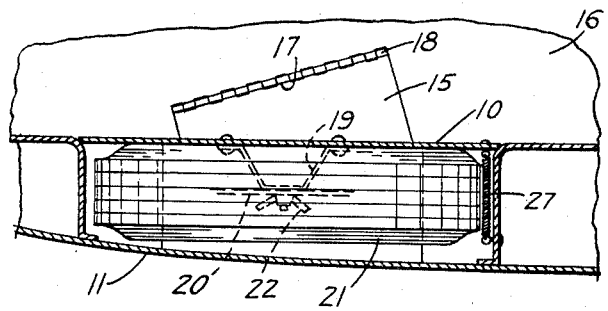
Figure 3:
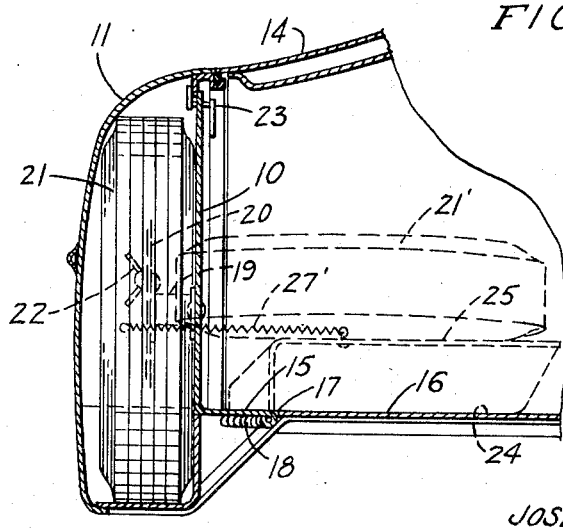

These and other objects and advantages of the present invention will be fully apparent from the following description when taken in connection with the annexed drawings, in which:

Figure 1 is an elevational view of the rear portion of an automobile showing the rear fender cut away revealing the spare wheel mounted on the support of the present invention, Figure 2 is a vertical view partially in cross-section on line 2—2 of Figure 1, and Figure 3 is an end view partially in cross-section looking rearwardly along line 3—3 of Figure 1.

Referring in greater detail to the drawings in which like numerals indicate like parts throughout the several views, the present invention consists of a spare wheel support for an automobile and comprises an upstanding panel 10 entirely closing the open side of an auxiliary compartment 11 extending along one side of the luggage compartment rearwardly of one rear wheel 12 of an automobile 13, the open side of the auxiliary compartment opening into the space within the luggage compartment of the automobile and under the rear deck 14.

The lower end of the panel 10 is provided with an extension 15 projecting perpendicularly thereto and formed as an integral part thereof, the panel and extension preferably being constructed of rigid aluminum, steel, or the like. The extension 15 is normally horizontal and is preferably positioned within a recess formed in the floor 16 of the compartment so that when in the horizontal position its upper face is level with the compartment floor.

The end edge 17 of the extension 15 is disposed at an angle to the longitudinal axis of the automobile and also the panel 10 and is connected by a hinge 18 to the compartment floor so that the panel may be swung from its position closing the space under the body paneling 11 to a position fully within the compartment and resting upon the compartment floor.

Means is provided on one face of the panel facing the space under the body paneling 11 for mounting a spare tire or wheel and consists in a U-shaped bracket 19 having outspread legs and a plate 20 to which may be secured the web of the spare wheel 21, a suitable bolt and wing nut, as indicated by the reference numeral 22, being provided to detachably lock the wheel in its place.

A latch 23 on the upper end of the panel 10 keeps the panel 10 in its upward position with the wheel nested under the fender.

When the panel 10 is swung to its substantially horizontal position within the compartment, the rear edge of the panel, shown in dotted lines in Figure 3 and indicated by the reference numeral 24, is adjacent to the rear edge of the compartment floor and due to the angle of the extension's end edge 15 the front edge of the panel, also shown in dotted lines in Figure 3 and indicated by the reference numeral 25 is raised above the floor so that mud and snow which may be carried by the wheel and tire assembly may be easily brushed off the surface of the panel 10 and out of the compartment. This sloping position of the panel 10 is shown in dotted lines in Figure 1, as indicated by the reference numeral 26.

The side walls of the body paneling 11 constitute the side walls of the luggage compartment of the automobile and the space rearwardly of one of the automobile rear wheels constitutes a hollowed-out portion in the compartment's side wall.

A spring 27 connected by one end to the panel 10 and by the other end to the inner portion of the body paneling assists in returning the panel to its upright position. The spring 27 is shown in its extended position, as indicated by the reference numeral 27' in Figure 3, and the wheel is shown in dotted lines in that figure and indicated by the reference numeral 21'.

The wheel and tire assembly support of the present invention therefore is seen to utilize effectively the space to the rear of at least one rear wheel under the body paneling of automobiles presently in use, and enhances the appearance of the luggage compartment, as well as provides a means for protecting the compartment and articles therein from dirt which may accompany a wheel and tire assembly after changing.

What is claimed is:

1. The combination with an automobile body having a luggage compartment including an auxiliary compartment extending along one side thereof formed of a size to house a wheel and tire assembly, said auxiliary compartment having one side opening to said luggage compartment, of an upstanding panel closing the open side of said auxiliary compartment and movable from the upstanding position to a substantially horizontal position, mounting means carried by the inner face of said panel for detachably supporting a wheel and tire assembly, and releasable cooperating fastening means on said panel and said auxiliary compartment for holding said panel in its upstanding position.

2. The combination with an automobile body having a luggage compartment having a floor and an auxiliary compartment extending along one side of said luggage compartment and formed of a size to house a wheel and tire assembly, said auxiliary compartment having one side opening to said luggage compartment, of an upstanding panel closing the open side of said auxiliary compartment and connected to said floor for movement from the upstanding position to a substantially horizontal position, mounting means carried by the inner face of said panel for detachably supporting a wheel and tire assembly, and releasable cooperating fastening means on said panel and said auxiliary compartment for holding said panel in its upstanding position.

3. The combination with an automobile body having a luggage compartment having a floor and an auxiliary compartment extending along one side of the luggage compartment and formed of a size to house a wheel and tire assembly, said auxiliary compartment having one side opening to said luggage compartment of an upstanding panel closing the open side of said auxiliary compartment and connected to said floor for movement from the upstanding position to a position substantially horizontal and wholly within said compartment resting on said compartment floor and sloping to the rear end of said compartment, mounting means carried on the inner face of said panel for detachably supporting a wheel and tire assembly, and releasable cooperating fastening means on said panel and said auxiliary compartment for holding said panel in its upstanding position.

References Cited in the file of this patent

UNITED STATES PATENTS

| | | |
|---|---|---|
| 2,553,686 | Stromberg | May 22, 1951 |
| 2,700,572 | Torrance | Jan. 25, 1955 |

FOREIGN PATENTS

| | | |
|---|---|---|
| 1,064,655 | France | Dec. 30, 1953 |
| 631,921 | Great Britain | Nov. 11, 1949 |